(12) United States Patent
Krijn et al.

(10) Patent No.: US 10,959,381 B2
(45) Date of Patent: Mar. 30, 2021

(54) SYSTEMS AND METHODS OF ILLUMINATING PLANTS

(71) Applicant: SIGNIFY HOLDING B.V., Eindhoven (NL)

(72) Inventors: Marcellinus Petrus Carolus Michael Krijn, Eindhoven (NL); Gabriel-Eugen Onac, Veldhoven (NL)

(73) Assignee: SIGNIFY HOLDING B.V., Eindhoven (NL)

( * ) Notice: Subject to any disclaimer, the term of this patent is extended or adjusted under 35 U.S.C. 154(b) by 169 days.

(21) Appl. No.: 15/563,872

(22) PCT Filed: Mar. 31, 2016

(86) PCT No.: PCT/EP2016/056998
§ 371 (c)(1),
(2) Date: Oct. 2, 2017

(87) PCT Pub. No.: WO2016/156452
PCT Pub. Date: Oct. 6, 2016

(65) Prior Publication Data
US 2018/0116127 A1 May 3, 2018

(30) Foreign Application Priority Data
Mar. 31, 2015 (EP) ..................... 15161920

(51) Int. Cl.
*A01G 7/04* (2006.01)
*H05B 45/20* (2020.01)

(52) U.S. Cl.
CPC ............. *A01G 7/045* (2013.01); *H05B 45/20* (2020.01); *Y02P 60/146* (2015.11)

(58) Field of Classification Search
CPC . A01G 7/045; A01G 9/20; A01G 9/26; A01G 1/00; A01G 7/00; H05B 33/0872; H05B 37/0218; H05B 37/0227
(Continued)

(56) References Cited

U.S. PATENT DOCUMENTS 8,847,514 B1 * 9/2014 Reynoso ............... A01G 7/045
315/307
2006/0254135 A1 11/2006 Dubuc
(Continued)

FOREIGN PATENT DOCUMENTS

CA 2888618 A1 4/2015
CN 87104841 A 1/1988
(Continued)

OTHER PUBLICATIONS

Hogewoning, Sander W., et al., "Blue Light Dose-Responses of Leaf Photosynthesis, Morphology, and Chemical Composition of Cucumis Sativus Grown Under Different Combinations of Red and Blue Light," Journal of Experimental Botany, vol. 61, No. 11, 2010 (11 Pages).
(Continued)

*Primary Examiner* — Tien Q Dinh
*Assistant Examiner* — Brady W Frazier
(74) *Attorney, Agent, or Firm* — Meenakshy Chakravorty

(57) ABSTRACT

The present invention generally relates to systems and methods of illuminating plants, in particular, to providing supplemental lighting in addition to natural light to plants, and improving the crop yield when using such supplemental lighting. The invention is well suited for use in horticulture, for instance, in greenhouses.

11 Claims, 5 Drawing Sheets

(58) Field of Classification Search
USPC .................................................... 47/58.1 LS
See application file for complete search history.

(56) References Cited

U.S. PATENT DOCUMENTS

| | | | |
|---|---|---|---|
| 2011/0209400 A1 | 9/2011 | Rooymans | |
| 2012/0210637 A1* | 8/2012 | Kamahara | A01G 7/045 47/17 |
| 2012/0218750 A1* | 8/2012 | Klase | F21V 5/007 362/231 |
| 2014/0215915 A1* | 8/2014 | Suzuki | A01H 3/02 47/58.1 LS |
| 2014/0250778 A1* | 9/2014 | Suntych | A01G 7/045 47/1.4 |
| 2014/0374780 A1* | 12/2014 | Schaefer | H01L 33/507 257/88 |
| 2015/0061510 A1* | 3/2015 | Maxik | A01G 7/045 315/153 |
| 2015/0128488 A1* | 5/2015 | Casper | A01G 7/045 47/58.1 LS |
| 2015/0128489 A1* | 5/2015 | Yamada | A01G 7/045 47/58.1 LS |
| 2015/0150195 A1* | 6/2015 | Grajcar | A01G 7/045 47/58.1 LS |
| 2015/0230409 A1* | 8/2015 | Nicole | A01G 7/045 47/17 |
| 2015/0250106 A1* | 9/2015 | Wik | A01G 7/045 47/58.1 LS |
| 2015/0313092 A1* | 11/2015 | Pocock | A01G 22/00 47/58.1 LS |
| 2015/0351325 A1* | 12/2015 | Shelor | A01G 7/045 47/58.1 LS |
| 2016/0088802 A1* | 3/2016 | Nicole | A01G 7/045 47/58.1 LS |
| 2017/0339839 A1* | 11/2017 | Carstensen | A01G 7/045 |

FOREIGN PATENT DOCUMENTS

| | | |
|---|---|---|
| CN | 102917493 A | 2/2013 |
| CN | 203848076 U | 9/2014 |
| EP | 2761997 A1 | 6/2014 |
| EP | 235670 B1 | 11/2017 |
| GB | 2382014 A | 5/2003 |
| WO | 2011033177 A2 | 3/2011 |
| WO | 2014188303 A1 | 11/2014 |

OTHER PUBLICATIONS

Hawley, David W., "Deveopment of a Variable-Spectra LED Array for Optimized Plant Development," A Thesis Presented to the University of Guelph, 2013 (80 Pages).

Yano, Akira et al., "Plant Lighting System With Five Wavelength-Band Light-Emitting Diodes Providing Photon Flux Density and Mixing Ratio Control," Plant Methods 2012 (12 Pages).

Akira Yano, et al., "Plant Lighting System With Five Wavelength-Band Light-Emitting Diodes Providing Photon Flux Density and Mixing Ratio Control," Plant Methods, 2012 (12 Pages).

* cited by examiner

SYSTEMS AND METHODS OF ILLUMINATING PLANTS

CROSS-REFERENCE TO PRIOR APPLICATIONS

This application is the U.S. National Phase application under 35 U.S.C. § 371 of International Application No. PCT/EP2016/056998, filed on Mar. 31, 2016, which claims the benefit of European Patent Application No. 15161920.2, filed on Mar. 31, 2015. These applications are hereby incorporated by reference herein.

FIELD OF THE INVENTION

The present invention generally relates to systems and methods of illuminating plants, in particular, to providing supplemental lighting in addition to natural light to plants, and improving the crop yield when using such supplemental lighting. The invention is well suited for use in horticulture.

BACKGROUND

Supplemental lighting is increasingly used in horticulture in order to improve growth of fruits and vegetables in greenhouses, especially during seasons when natural daylight alone is not sufficient. Supplemental lighting allows growth of fruits and vegetables all year round.

For instance, the growing of tomatoes in The Netherlands involves supplemental lighting in the winter, autumn and spring, since daylight during these seasons is typically lacking. At the same time tomato prices are highest during these seasons, which more than compensates for the investment cost and energy cost for supplemental lighting.

LEDs (light emitting diodes) are solid-state light sources. LEDs have a number of advantages over other light sources, such as durability, longevity, compactness and efficiency. Usefully, LEDs also provide narrow-band spectral emissions, meaning the spectral profile of a LED lighting system can be optimised for a particular application or crop type. Further, LEDs provide high light output with low radiant heat, as well as flexibility in design and placement in lighting systems. Recent advances have ensured LEDs are available in an increasing number of wavelengths and at decreasing cost. As a result, LEDs are increasingly favoured for use in horticulture.

A main objective in horticulture is to maximize the crop yield (in terms of biomass or fruit yield), while keeping the energy consumed by the lighting as low as possible.

When using LEDs as the light source, wavelengths are typically chosen where the photosynthetic efficiency is highest. Photosynthesis is the mechanism used by plants to convert $CO_2$ from the air in combination with water and light into sugars. The biomass growth is proportional to the amount of sugars produced. The wavelength dependence of the photosynthetic response is shown in FIG. 1 (this response curve is also known as the 'McCree curve', or the 'photosynthetic response curve'). The distribution is slightly peaked in the blue and red region of the spectrum.

As an approximation of this curve, all radiation within the wavelength region between 400 nm and 700 nm is called 'photosynthetically-active-radiation' (PAR), also shown in FIG. 1. The PAR can be expressed in numbers of photons per surface area per second, and is known as the 'photosynthetic photon flux density' (PPFD). The number of photons is usually expressed in µmol, where 1 mol amounts to $6.02 \times 10^{23}$ photons. PAR may also be expressed as the amount of energy per surface area per second, and this measurement is known as light intensity. Light intensity and PPFD are interconvertible. PPFD is more commonly used in the art, and thus is the preferred measure for the purposes of the present invention.

FIG. 1 also shows the 'daylight photon flux spectrum' (as defined in the standard AM1.5G, ASTM G173 from the American Society for Testing and Materials), between 300 and 800 nm.

For plant growth, the spectral region from 400 nm-800 nm is most important. The blue (B) region extends from 400 nm-500 nm, green (G) from 500 nm-600 nm, red (R) from 600 nm-700 nm, and far-red (FR) from 700 nm-800 nm.

The PAR photon flux of daylight may be expressed as $F_{PAR}=F_B+F_G+F_R$, where $F_B+F_G+F_R$ may be used to denote the flux of blue light, green light and red light, respectively. For daylight the respective ratios of blue light, green light and red light, are $F_B$: $F_G$: $F_R$=0.27: 0.35: 0.38. $F_{FR}$ is the flux of far-red light. When expressed relative to the amount of $F_{PAR}$, the ratio is $F_{FR}$: $F_{PAR}$=0.36.

Since it is known that plants grow well in daylight, a common approach in the art is to use a supplemental light spectrum that mimics daylight.

Whilst LEDs offer advantages over other forms of lighting such as incandescent and fluorescent lighting, there is a need to improve the efficiency of LED lighting systems. Electricity is an increasingly expensive and valuable resource. This is particularly so during the spring, autumn and winter months, when energy demand is the highest.

It is therefore an object of the present disclosure to improve the efficiency of such supplemental lighting systems.

STATEMENTS OF THE INVENTION

In a first aspect the present disclosure provides a system for illuminating a plant in the presence of an additional light source, which system comprises: a blue light source; a far-red light source; and a controller configured to vary the outputs of the blue light source and the far-red light source, the outputs of the blue light source, far-red light source and additional light source combining to provide an amount of photosynthetically active radiation to illuminate the plant, and wherein the controller is configured to vary (i) the output of the blue light source such that, as the output of the additional light source varies, the fraction of total blue light in the photosynthetically active radiation is no less than a first predetermined minimum, and/or (ii) the output of the far-red light source such that, as the output of the additional light source varies, the fraction of total far-red light in the photosynthetically active radiation is no less than a second predetermined minimum.

In a second aspect the present disclosure provides a method of illuminating a plant in the presence of an additional light, comprising: providing blue light; providing far-red light; combining the blue light, far-red light and additional light to provide an amount of photosynthetically active radiation to illuminate the plant; and varying the blue light such that, as the additional light varies, a fraction of total blue light in the photosynthetically active radiation remains greater than a first predetermined minimum, and/or varying the far-red light such that, as the additional light varies, a fraction of total far-red light in the photosynthetically active radiation remains greater than a second predetermined minimum.

In a third aspect the present disclosure provides a method of illuminating a plant in the presence of an additional light, comprising: providing blue light; providing far-red light; combining the blue light, far-red light and additional light to provide an amount of photosynthetically active radiation to illuminate the plant; and (i) automatically varying the blue light such that, as the additional light varies, a fraction of total blue light in the photosynthetically active radiation is no less than a first predetermined minimum, and/or (ii) automatically varying the far-red light such that, as the additional light varies, a fraction of total far-red light in the photosynthetically active radiation is no less than a second predetermined minimum.

In a fourth aspect the present disclosure provides a computer readable storage medium comprising a computer readable program provided therein, which when executed in a system according to the first aspect of the disclosure, performs a method according to second aspect of the disclosure.

The present disclosure improves energy usage of an LED lighting system for use in horticulture, by taking into account LED efficiencies and tailoring the light offered to the plant to provide the optimal photosynthetic and growth response, to thereby maximise crop yield whilst minimising the energy consumed.

The present invention is defined by the independent claims. Further features of the present invention are defined in the dependent claims.

BRIEF DESCRIPTION OF THE FIGURES

Reference is made to the accompanying drawings, in which.

DETAILED DESCRIPTION OF THE INVENTION

Figure 1:
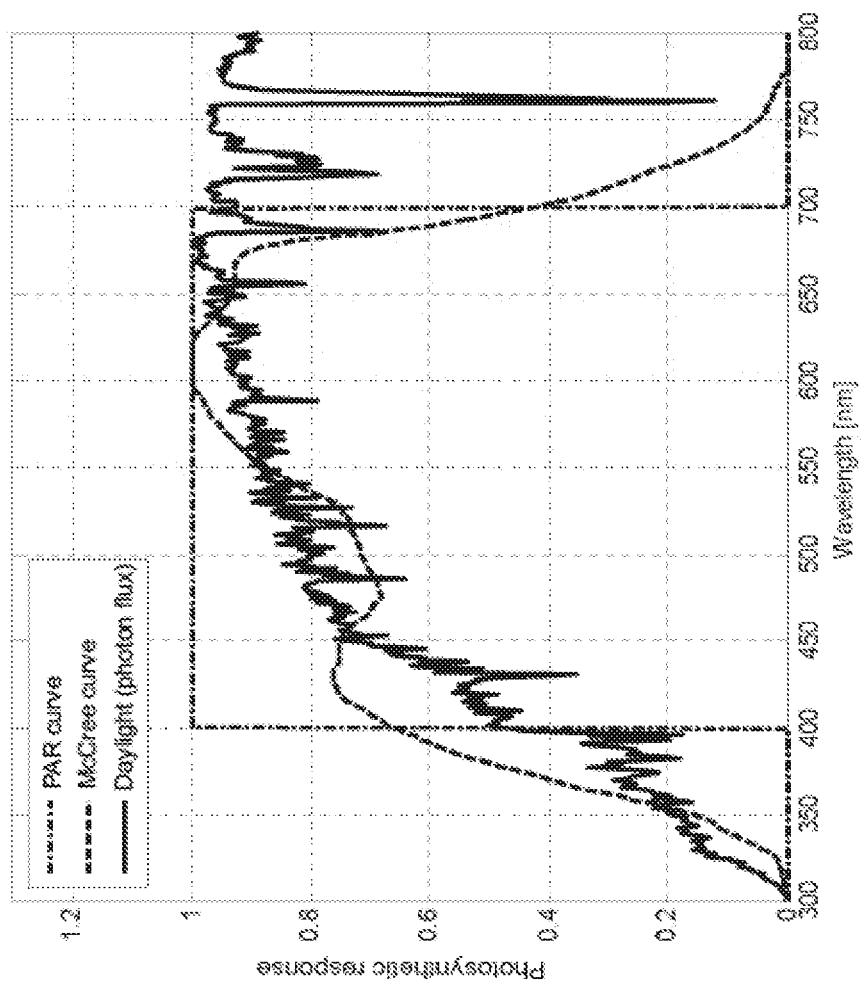
FIG. 1 is a graph showing the 'PAR', the 'daylight photon flux spectrum' and the 'McCree curve'.

The present disclosure provides a system for illuminating a plant in the presence of an additional light source, which system comprises: a blue light source; a far-red light source; and a controller configured to vary the outputs of the blue light source and the far-red light source, the outputs of the blue light source, far-red light source and additional light source combining to provide an amount of photosynthetically active radiation to illuminate the plant, and wherein the controller is configured to vary (i) the output of the blue light source such that, as the output of the additional light source varies, the fraction of total blue light in the photosynthetically active radiation is no less than a first predetermined minimum, and/or (ii) the output of the far-red light source such that, as the output of the additional light source varies, the fraction of total far-red light in the photosynthetically active radiation is no less than a second predetermined minimum.

The present system, method and controller are suited for use in horticulture. The system, method and controller may be used to supplement natural light in greenhouses, or in city farms with daylight entry. The system, method and controller may also be used in the absence of daylight.

As used herein, when a colour such as 'blue', 'red' and 'far-red' is used to describe light, it means light having a wavelength falling within a particular range. In an aspect 'blue' light means light falling within the range from 400 nm-500 nm, 'green' light means light falling within the range from 500 nm-600 nm, 'red' light means light falling within the range from 600 nm-700 nm, and 'far-red' light means light falling within the range from 700 nm-800 nm. It will be appreciated that each range may also be defined as a 'channel', for instance, the 'blue channel' denotes light falling within the range from 400 nm to 500 nm. In an aspect, the term 'photosynthetically active radiation', or PAR, means light falling within the range 400 to 700 nm. According to a less preferred definition, 'photosynthetically active radiation' may mean light falling within the range 400 to 800 nm. The term 'photosynthetically active radiation' denotes the sum of all light provided to the plant, both artificial and natural.

As used herein, the term 'light source' means any source of light that emits light radiation. The term may cover a device for producing artificial light, such as a luminaire, which may comprise features such as a lamp, a housing for the lamp and any associated equipment, or the lamp itself. Further, the lamp may be provided in a variety of forms as known in the art, including an incandescent lamp (such as a halogen lamp), an LED lamp, an arc lamp (such as a metal-halide lamp), or a gas-discharge lamp (such as a fluorescent lamp). The term 'light source' may also include natural light, i.e. sunlight.

The term 'blue light source' means a light source that produces blue light. The output of the blue light source may have a spectrum falling entirely within the range of 400 nm to 500 nm. Alternatively, more than 50%, 60%, 70%, 80% or 90% of the light produced by the blue light source may fall within the range of 400 nm to 500 nm, and/or the output of the blue light source may have a spectrum with a peak wavelength in the range of 400 nm to 500 nm.

The term 'far-red light source' means a light source that produces far-red light. The output of the far-red light source may have a spectrum falling entirely within the range of 700 nm-800 nm. Alternatively, more than 50%, 60%, 70%, 80% or 90% of the light produced by the far-red light source may fall within the range of 700 nm-800 nm, and/or the output of the far-red light source may have a spectrum with a peak wavelength in the range of 700 nm-800 nm.

The term 'red light source' means a light source that produces red light. The output of the red light source may have a spectrum falling entirely within the range of 600 nm-700 nm. Alternatively, more than 50%, 60%, 70%, 80% or 90% of the light produced by the red light source may fall within the range of 600 nm-700 nm. Alternatively, the output of the red light source may have a spectrum with a peak wavelength in the range of 600 nm-700 nm.

While red light is the most efficient in driving photosynthesis, a certain minimum of blue light (the radiation in the wavelength region between 400 nm and 500 nm) is desired for optimal growth, since blue light plays an important role in keeping the stomata of the leaves open to ensure a steady inflow of $CO_2$ into the leaves for photosynthesis. Hogewoning et al. (Journal of Experimental Botany, Vol 61, pp. 3107-3117, 2010) found that the rate of $CO_2$ assimilation (the amount of $CO_2$ intake by a leaf as a function of time) depends quantitatively on the fraction of blue light in the PAR offered to the plant up to 50%. This fraction is thought to be important inter alia in keeping the stomata of the leaves open.

The inventors have discovered that a fraction of around 15% blue light provides a rate of $CO_2$ assimilation that maximises crop yield for a given amount of PAR supplied by the supplemental light (and hence amount of energy consumed). The inventors have found the minimum blue light fraction to be 5%—lower values provide very low crop yields (data not shown). However, each successive percentage point increase above 15% provides a corresponding diminishing increase in crop yield for a given amount of PAR supplied by the supplemental light (and hence amount of energy consumed).

The far-red part of the spectrum (the radiation in the wavelength region between 700 nm and 800 nm) governs plant morphology and therefore light interception. Insufficient amounts of far-red light leads to plant growth resulting in a dense and compact morphology. Such a morphology is disadvantageous, since much of the plant is unable to intercept sufficient light for photosynthesis. Thus far-red light ensures that the plant is able to intercept as much light as possible (e.g. by minimizing the possibility of one leaf shadowing another leaf). The inventors have discovered a far-red fraction of around 10% of the PAR maximises crop yield for a given amount of PAR supplied by the supplemental light (and hence amount of energy consumed). However, each successive percentage point increase above 10% provides a corresponding diminishing increase in crop yield for a given amount of PAR supplied by the supplemental light (and hence amount of energy consumed).

In daylight, the fraction of blue light is, on average, approximately 27% of the PAR, and the far-red fraction approximately 36%. However, the daylight does not necessarily provide the optimum spectrum for photosynthesis. Mimicking daylight thus leads to a relatively inefficient solution. Thus, it is preferred not to provide a fraction of blue light and far-red fraction above the average values observed in daylight, i.e. 27% and 36%, respectively.

Thus for optimum growth and maximum yield, the PAR should contain certain minimum fractions of blue and far-red light. The present system, method and controller take these minimum fractions into account. By ensuring the total amounts of blue and far-red light in the photosynthetically active radiation offered to a plant are above predetermined minima, the present disclosure ensures optimum growth and yield.

As can be seen from FIG. 1, the greatest photosynthetic response is observed at around 550 to 650 nm; the efficiency of photosynthesis in the blue and far-red light channels is comparatively lower. It is inefficient to increase the fraction of blue and far-red light beyond the minimum required to ensure optimal growth and morphology.

Further, different LEDs typically exhibit different efficiencies. The generation of blue and far-red light photons is relatively costly. Typical LED efficiencies are shown below.

TABLE 1

LED Efficacies (including driver losses)

| Channel | Efficacy ($\mu$mol/J) |
| --- | --- |
| Blue (450 nm) | 1.22 |
| Red (660 nm) | 1.92 |
| Far-red (740 nm) | 1.53 |

Thus using LED lighting to generate blue and far-red light is relatively energy inefficient compared to generating red light. The present systems, methods and controllers take these LED efficiencies into account by minimising the use of the LEDs having the lowest efficiencies to provide a PAR profile that provides an improved biomass yield per unit of energy consumed.

The focus of the present systems, methods and controllers are the use of supplemental, or artificial, lighting to supplement daylight, for instance, in a greenhouse. Thus the additional light source may comprise sunlight. As used herein the term 'supplemental' and 'artificial' are synonymous. Lights are 'supplemental' in the sense that they are used to supplement natural daylight. However it will be appreciated that the systems, methods and controllers may be used in the complete absence of daylight, for instance, before sunrise and after sunset in such a greenhouse.

It will be appreciated that the radiation from daylight varies throughout the day. Thus the output of the blue and far-red light sources may be varied throughout the day to provide an amount of photosynthetically active radiation having predetermined fractions of blue and far-red light that varies in response to the varying daylight.

Since only a minimum fraction of blue and far-red light is required (which fractions are lower than the corresponding values in daylight), and since the blue and far-red light is generally more expensive to produce compared to red light, the present systems, methods and controllers provide improvements in energy efficiency by dynamically varying the spectrum of the photosynthetically active radiation (i.e. the sum of the supplemental light and daylight) offered to the plants such that these minimum fractions are provided. By minimising the amount of artificially produced blue and far-red light, more red light is produced per amount of energy consumed by the supplemental lighting. As noted previously, red light is most efficiently utilised by plants in photosynthesis, which means the increased amount of red light produced per energy consumed results in an improvement in biomass yield per energy consumed.

The term 'dynamic', used in reference to the term 'vary', may mean that the steps of varying are carried out continuously throughout the day. In an alternative aspect, the steps of varying may be carried out at discrete intervals throughout the day, for instance, once, twice, or more times throughout the daily cycle, or at defined intervals the day (for instance, every 30 seconds, or 1, 5, 10, 15, 20, 30 or 60 minutes). It will be appreciated that varying at discrete intervals may be advantageous, for instance, by not subjecting users (such as greenhouse workers) to constant changes in the output of the supplemental lighting as the weather alternates between cloudy and sunny throughout the day, thereby improving user comfort. The steps of varying are carried out by a controller specifically adapted to do so.

Figure 4:
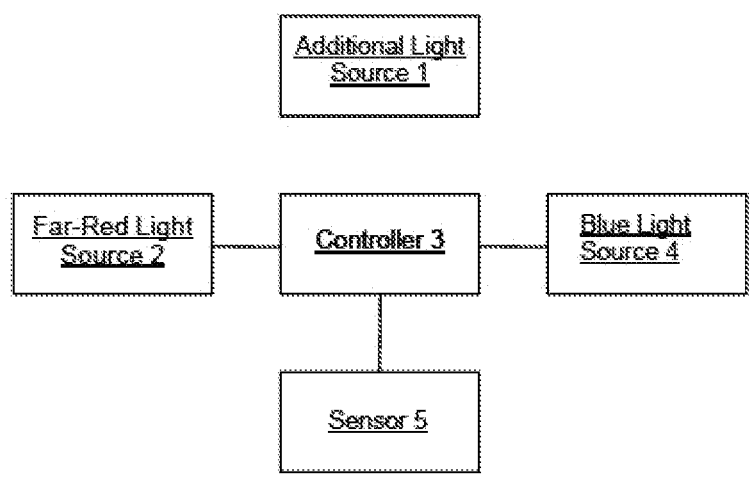
FIG. 4 is a schematic illustration of a system for illuminating a plant according to aspects of the present disclosure.

The additional light source 1 (for example, shown in FIG. 4) may comprise a red light source. This red light source may be supplemental to the daylight, but may also be used in the absence of daylight. Thus in an aspect the additional light sources comprise sunlight and a red light source. As noted previously, red light is particularly well utilised by plants during photosynthesis. Further, red LEDs typically exhibit greater efficiencies compared to blue and far-red LEDs (see table 1). Thus the supplemental red light source may be on full power whenever the supplemental lighting is used, or in other words, the output of the red light source may not varied. Provided fractions of total blue and total far-red light in the photosynthetically active radiation offered to the plants exceed their respective minima, it is advantageous to provide the plant with plenty of red light. However, less than full power may be used, if desired. In an aspect, the amount of red light provided to the plant may be varied in response to the amount of daylight. Where the amount of daylight offered to the plant is lower than (or is forecasted to be lower than) the preferable amount of PAR to be offered to the plant, the amount of red light may be increased to compensate for the lower amount of daylight.

The varying of the output of the blue and far-red light sources may be carried out as follows. In particular, the controller may be configured to determine the fraction of total blue light in the photosynthetically active radiation on the basis of values corresponding to the amount of blue light in the photosynthetically active radiation, and/or the amount of far-red light in the photosynthetically active radiation.

In a preferred aspect, the 'amount' of light is measured by determining the photon flux (in units of the number of photons per unit surface area per unit time). The 'amount' may also be measured by determining the light intensity (in units of the amount of energy per unit surface area per unit time), although this is less preferred. The two types of measurement are interchangeable as is known in the art.

The term 'fraction of total blue light in the photosynthetically active radiation' may mean the total photon flux of blue light, i.e. falling within the range 400 to 500 nm, expressed as a proportion of the total photon flux of the photosynthetically active radiation. Similarly the term 'fraction of total far-red light in the photosynthetically active radiation' may mean the total photon flux of far-red light, i.e. falling within the range 700 to 800 nm, expressed as a proportion of the total photon flux of the photosynthetically active radiation. The total photon flux of the photosynthetically active radiation is preferably measured in the range of 400 to 700 nm.

First, the amount of the photosynthetically active radiation offered to the plant, and the blue light and far-red light fraction thereof, may be determined. This determination may be carried out by measuring the radiation. Measurement may be carried out by any means known in the art, for instance, with a light sensor 5 (for example, shown in FIG. 4), such a spectroradiometer. Alternatively, the amount of the photosynthetically active radiation may be determined based on known and estimated variables. For instance, when there is only artificial light and no daylight, the amount of the photosynthetically active radiation offered to a plant using blue, red and far-red lights may be determined based solely on the known outputs of each light. Further, the amount of daylight, where present, may be estimated based on data such as meteorological data. However, it is preferred to measure the 'amount' of light directly.

In an aspect, at least three separate light sensors may be provided, each individually configured to measure the blue light, red light and far-red light radiation respectively in the PAR offered to the plant. Alternatively, a light sensor may be configured to measure the respective levels of the blue light, red light and far-red light radiation. Alternatively, a light sensor may be provided to measure the amount of additional light alone, where the additional light is daylight. The respective amounts of blue, red and far-red light in daylight may be estimated, since the spectrum of daylight is known and constant to some degree (see, for instance, the daylight spectrum in FIG. 1). The respective amounts of blue, red and far-red light provided by the supplemental light may also be estimated (as a function of the energy provided to the supplemental light). Thus, with knowledge of the daylight spectrum, a light sensor measuring the daylight light level, and estimates of the respective amounts of blue, red and far-red light provided by the supplemental lights, it is possible to derive the fractions of blue and far-red light in the PAR offered to the plant.

Second, the fraction of the blue light and far-red light as a proportion of the total PAR is calculated. Alternatively, the fraction of the blue light and far-red light as a proportion of the light falling within the range of 400-800 nm. Calculation is carried out by means known in the art. The controller may be configured to calculate the fractions.

Third, the output of the blue light source and the far-red light source are varied such that the blue light fraction and the far-red light fraction of the photosynthetically active radiation offered to the plant is greater than the minimum fractions for blue and far-red light, respectively. Variation of the outputs of the light sources is carried out by the controller in a manner known in the art. For instance, the controller may comprise a variable switch adapted to dim or brighten the light sources as appropriate, for example, by varying the voltage and/or current supplied to the respective light sources.

LED lamps are preferably used as the light source for the disclosed systems, methods and controllers. Thus the blue light source, the far-red light source and/or the red light source may each be provided as an LED lamp. However, it will be appreciated that non-LED lamps, such as fluorescent lamps, may also be used with the disclosed systems, methods and controllers, since the improvements in biomass yield obtained from such systems will also be seen from the minimising of blue and far-red light, and maximizing red light, per amount of energy consumed.

The present disclosure provides a system of optimising supplemental lighting that takes these factors into account. The output of the blue and/or the far-red light sources of the supplemental light is dynamically varied, such that during the daily cycle, the photosynthetically active radiation (i.e. supplemental and daylight, or supplemental alone when there is no daylight) comprises fractions of blue light and far-red light that are each greater than defined minima. The supplemental lighting may be further optimised by ensuring the fractions are less than defined maxima.

At all times during the day when the supplemental lighting is on, the outputs of the blue and/or far-red light sources are varied such that the fraction of total blue light in the photosynthetically active radiation exceeds a certain value, which may be referred to as $f_B$, and the fraction of total far-red light in the photosynthetically active radiation exceeds a certain value, which may be referred to as $f_{FR}$.

The output of the blue and/or the far-red light sources, which may be measured in units of photon flux, may be defined as $F_B^{LED}$ and $F_{FR}^{LED}$, respectively.

In an aspect, when 'photosynthetically active radiation' means the channel defined by PAR, i.e. light falling within the range 400 to 700 nm, the blue fraction and the far-red fraction of the photosynthetically active radiation may be defined as $F_B^{Total}/F_{PAR}^{Total}$ and $F_{FR}^{Total}/F_{PAR}^{Total}$, respectively.

In accordance with this aspect of the present disclosure, $F_B^{LED}$ may be dynamically varied such that $f_B < F_B^{Total}/F_{PAR}^{Total} < 27\%$. Similarly, $F_{FR}^{LED}$ may be dynamically varied such that $f_{FR} < F_{FR}^{Total}/F_{PAR}^{Total} < 37\%$.

Thus the outputs of the blue and the far-red light sources are varied as a function of the fractions of total blue light and total far-red light in the photosynthetically active radiation, respectively.

The amount of total blue light and total far-red light provided to the plant in the photosynthetically active radiation may be minimized. This may be carried out by varying the output of the blue and/or far-red light sources such that the fraction of the total blue and/or total far-red light in the photosynthetically active radiation offered to the plant is as close as possible to the minima $f_B$ and $f_{FR}$, respectively.

Additionally, a maximum value for the fractions of the total blue and/or total far-red light in the photosynthetically active radiation may be set. The fraction of total blue light in the photosynthetically active radiation may be less than a first maximum, and/or the fraction of total far-red light in the photosynthetically active radiation may be less than a second maximum.

The fraction of total blue light in the photosynthetically active radiation is greater than a minimum $f_B$, which may be 5%, 6%, 7%, 8%, 9%, 10%, 11%, 12%, 13%, 14%, 15%, 16%, 17%, 18%, 19%, 20%, 21%, 22%, 23%, 24% or 25%. The preferred values for the minimum are 5%, 7%, 9%, 12% or 15%. The most preferred value is 15%. The fraction of total blue light in the photosynthetically active radiation may be less than a maximum. The maximum may be 27%, which corresponds to the fraction of blue light observed, on average, in sunlight. Providing fractions higher than 27% is possible, if desired. Other maximum fractions are possible, such as 16%, 18%, 19%, 20%, 21% or 22%. Preferred values for the maximum are 20%, 18%, or 16%. Alternatively, the maximum may correspond to 0.1%, 0.2%, 0.3%, 0.5%, 1%, 2%, 3%, 4% or 5% points above the minimum $f_B$. For instance, when $f_B$ is 15%, then 3% points above $f_B$ is 18%.

The advantages of the disclosed systems, methods and controllers are best realised when the fraction of total blue light in the photosynthetically active radiation is varied to be as close as possible to the minimum $f_B$ in order to minimize energy consumption.

The fraction of total far-red light in the photosynthetically active radiation is greater than a minimum $f_{FR}$, which may be 4%, 5%, 6%, 7%, 8%, 9%, 10%, 11%, 12%, 13%, 14%, 15%, 16%, 17%, 18%, 19% or 20%. The preferred values for the minimum are 4%, 6%, 8% or 10%. The most preferred value is 10%. The fraction of total far-red light in the photosynthetically active radiation may be less a maximum. The maximum may be 36%, which corresponds to the fraction of far-red light observed, on average, in sunlight. Providing fractions higher than 36% is possible, if desired. Other maximum fractions are possible, such as 13, 14, 15, 16, or 17%. Preferred values for the maximum are 15%, 13%, or 11%. Alternatively, the maximum may correspond to 0.1%, 0.2%, 0.3%, 0.5%, 1%, 2%, 3%, 4% or 5% points above the minimum $f_{FR}$. For instance, when $f_{FR}$ is 10%, and the maximum is 3% points above $f_{FR}$ then the maximum is 13%.

The advantages of the disclosed systems, methods and controllers are best realised when the fraction of total far-red light is varied to be as close as possible to the minimum $f_{FR}$ in order to minimize energy consumption.

The advantages of the disclosed systems, methods and controllers are best realised when minimum values of the total blue and total far-red light of 15% and 10%, respectively, of the photosynthetically active radiation are used together. However, other values of the minimum values of the total blue and far-red light are possible, such as 13% $f_B$ and 8% $f_{FR}$, 14% $f_B$ and 9% $f_{FR}$, 16% $f_B$ and 11% $f_{FR}$, 17% $f_B$ and 12% $f_{FR}$, and 18% $f_B$ and 13% $f_{FR}$.

Further, the advantages of the disclosed systems, methods and controllers are best realised when the both the total blue and far-red light fractions are maintained as close as possible to $f_B$ and $f_{FR}$, which minimises the energy consumption. For instance the advantage may be realized when the following pairs of maxima for the blue and far-red fractions are used: 16% and 11%, 17% and 12%, 18% and 13%, 19% and 14%, and 20% and 15%, respectively.

In an aspect, the fraction of total blue light in the photosynthetically active radiation may be a first constant. The fraction of total far-red light in the photosynthetically active radiation may be a second constant. The controller is configured to vary the output of the blue light source and/or the far-red light source is particularly well suited to provide constant fractions of blue light and/or far-red light in the photosynthetically active radiation when the controller varies the respective outputs of the lights continuously. By ensuring the respective fractions do not fluctuate (and in particular, by not increasing the fractions higher than necessary), energy usage is minimised. However, it will be appreciated that, in practice, such a value may exhibit small fluctuations, caused for instance by inaccuracies in the light sensor and control mechanisms, noise, system lag etc. Such small fluctuations, for instance 0.1%, 0.2%, 0.3%, 0.5%, 1% or 1.5% points within the constant value, still provide the advantages of the disclosed systems, methods and controllers.

In this way, the present disclosure allows for the combination of optimum growth with a minimum use of energy.

It will be appreciated that, when there is ample daylight such that the photosynthetically active radiation offered to the plant comprises a fraction of blue light that is greater than the minimum $f_B$, and/or a fraction of far-red light that is greater than a minimum $f_{FR}$, there may be no need to provide any supplemental blue or far-red light using the artificial lights. If this is the case, the blue and far-red lights may be switched off until the fractions of blue and far-red light fall below $f_B$ and $f_{FR}$.

In a further aspect, the present disclosure provides a method of illuminating a plant in the presence of an additional light, comprising: providing blue light; providing far-red light; combining the blue light, far-red light and additional light to provide an amount of photosynthetically active radiation to illuminate the plant; and varying the blue light such that, as the additional light varies, a fraction of total blue light in the photosynthetically active radiation is no less than a first predetermined minimum, and/or varying the far-red light such that, as the additional light varies, a fraction of total far-red light in the photosynthetically active radiation is no less than a second predetermined minimum.

In a further aspect, the present disclosure provides a method of illuminating a plant in the presence of an additional light, comprising: providing blue light; providing far-red light; combining the blue light, far-red light and additional light to provide an amount of photosynthetically active radiation to illuminate the plant; and (i) automatically varying the blue light such that, as the additional light varies, a fraction of total blue light in the photosynthetically active radiation is no less than a first predetermined minimum, and/or (ii) automatically varying the far-red light such that, as the additional light varies, a fraction of total far-red light in the photosynthetically active radiation is no less than a second predetermined minimum.

The term 'automatically' may mean the steps of varying are not carried out by a human. For instance, a mechanical or electrical device may be configured to carry out the steps independently of human control. Such a device may require some human input when the device is set up or maintained, but otherwise is capable of functioning without human input. Such a mechanical or electrical device comprises a controller, such as the controller of the present disclosure.

In a further aspect, the fraction of total blue light in the photosynthetically active radiation may be a first constant that is no less than the first predetermined minimum, or no less than the first predetermined minimum and no more than 1% point above the first predetermined minimum; and/or the fraction of total far-red light in the photosynthetically active radiation may be a second constant that is no less than the second predetermined minimum, or no less than the second predetermined minimum and no more than 1% point above the second predetermined minimum.

It will be appreciated that the system described above is particularly well suited to be used in the method of illuminating a plant in the presence of an additional light. Therefore all aspects of the system may be incorporated into such a method.

Figure 5:
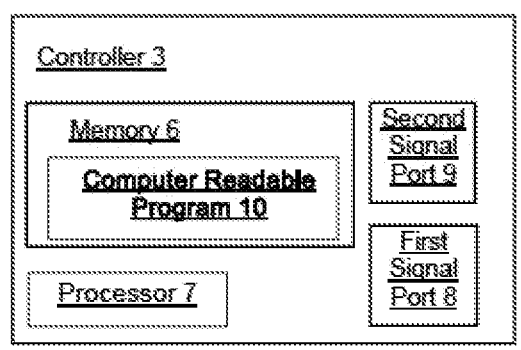
FIG. 5 is a schematic illustration of a controller according to aspects of the present disclosure.

In a further aspect, the present disclosure provides a controller 3 (for example, shown in FIG. 4 and FIG. 5) for use with a luminaire comprising a blue light source 4 (shown in FIG. 4) and a far-red light source 2 (shown in FIG. 4), the controller comprising: a first signal port 8 (shown in FIG. 5) configured to receive a value corresponding to a fraction of total blue light in the photosynthetically active radiation, and/or a value corresponding to a fraction of total far-red light the photosynthetically active radiation, wherein the blue light, far-red light and an additional light combines to provide the photosynthetically active radiation; a second signal port 9 (shown in FIG. 5) configured to control an output of the blue light source and/or an output of the far red light source; and a computer readable program 10 (shown in FIG. 5), which when executed, varies: (i) the output of a blue light source such that, as the additional light varies, the fraction of total blue light in the photosynthetically active radiation is no less than a first predetermined minimum, and/or (ii) an output of a far-red light source such that, as the additional light varies, a fraction of total of far-red light in the photosynthetically active radiation is no less than a second predetermined minimum.

The controller may be combined with any luminaire system comprising individually dimmable blue and far-red lights. For instance, a particularly useful luminaire system for use with the disclosed systems, methods and controllers is the 3-channel LED luminaires for horticulture growth with individual dimming channels, called the "Philips GreenPower research module" from Philips, which comprises individually controllable blue, red and far-red channels.

In a further aspect, the present disclosure provides a computer readable storage medium 6 (for example, memory 6 in FIG. 5) comprising a computer readable program 10 (shown in FIG. 5) provided therein, which when executed by a processor 7 (shown in FIG. 5) in a system according to the present disclosure, performs a method according to the present disclosure.

Other variations to the disclosed embodiments can be understood and effected by those skilled in the art in practicing the claimed invention, from a study of the drawings, the disclosure, and the appended claims. In the claims, the word "comprising" does not exclude other elements or steps, and the indefinite article "a" or "an" does not exclude a plurality. A single processor or other unit may fulfil the functions of several items recited in the claims. The mere fact that certain measures are recited in mutually different dependent claims does not indicate that a combination of these measures cannot be used to advantage. A computer program may be stored and/or distributed on a suitable medium, such as an optical storage medium or a solid-state medium supplied together with or as part of other hardware, but may also be distributed in other forms, such as via the Internet or other wired or wireless telecommunication systems. Any reference signs in the claims should not be construed as limiting the scope.

The invention may be understood by way for the following non-limiting example.

Example

The following example is based on a typical greenhouse on a sunny winter day in The Netherlands. Sunrise and sunset are at approximately 6 AM and 6 PM, respectively.

The supplemental lighting installation is capable of providing a maximum level of 15 µmol/m$^2$/s of blue light, a maximum level of 85 µmol/m$^2$/s of red light, and a maximum level of 10 µmol/m$^2$/s of far-red light. The blue and far-red channels are dimmable.

Figure 2:
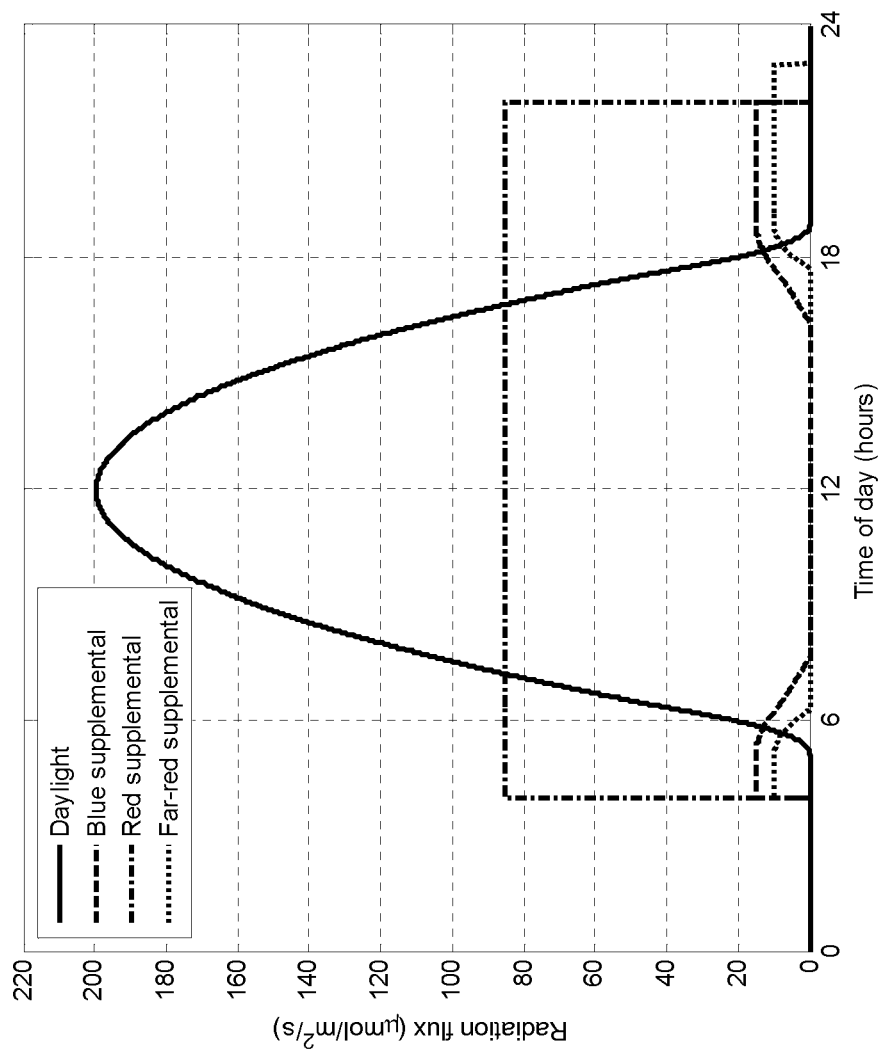
FIG. 2 is an example lighting scheme of the present invention.

The supplemental lighting for each colour channel offered to the plants during this typical day is as shown in FIG. 2. The supplemental lighting is switched on at 4 AM and switched off again at 10 PM (except for the far-red channel, which is switched of at 11 AM). Instead of abruptly switching off the lighting, the lighting is switched off gradually by providing 1 extra hour of far-red light alone at the end of the day.

The minimum fractions of $f_B$ and $f_{FR}$ are 15% and 10%, respectively, based on total PAR. The installation is set to vary the output of the blue and far-red lights to minimise the blue and far-red fractions to 15% and 10%, respectively.

The red channel is switched on at full power for the whole photoperiod to ensure the photosynthetically active radiation during the daily meets the need of the plants. The blue and the far-red channels are switched full on at full power when no daylight component is present (i.e. from 4 AM to around 6 AM and from around 6 PM to 10 PM), thereby meeting the minimum values of $f_B$ and $f_{FR}$.

As soon as the sun rises and daylight starts to contribute to the photosynthetically active radiation, the blue and the far-red channels are dimmed to save power, but always satisfying the limiting conditions for $f_B$ and $f_{FR}$. From around 7 or 8 AM, daylight provides enough blue and far-red light to satisfy the minimum conditions for $f_B$ and $f_{FR}$. It is therefore no longer necessary to provide supplemental blue and far-red light, and thus the blue and far-red channels are switched off.

The reverse happens at the end of the day when the blue and far-red contributions from the daylight decrease and artificial lighting blue and far-red channels compensate to ensure the conditions for $f_B$ and $f_{FR}$.

Figure 3:
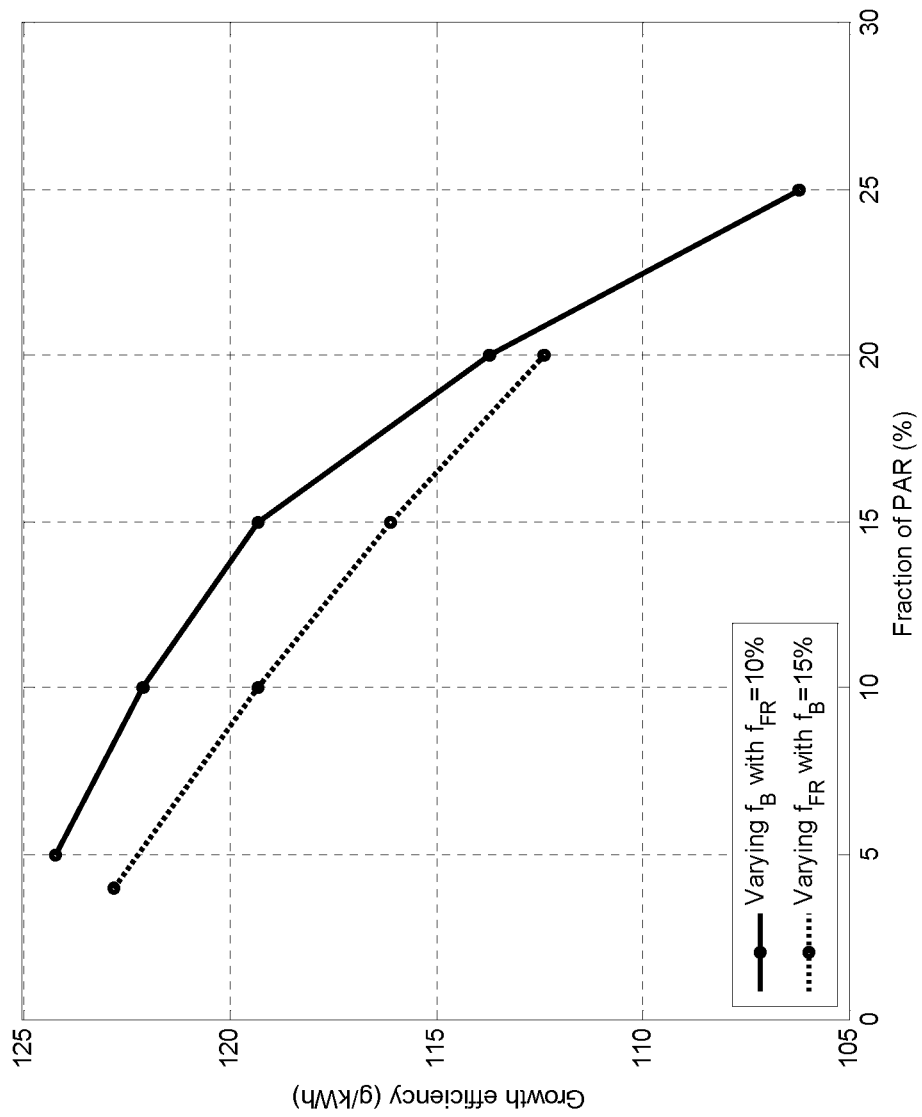
FIG. 3 is a graph showing growth efficiency with varying fractions of blue, while fraction of far-red is fixed, and varying fractions of far-red, while fraction of blue is fixed.

With respect to experimental results depicted in FIG. 3, again consider a typical case for greenhouse supplemental lighting based on blue, red, and far-red color channels provided by LEDs with wavelengths and efficacies as listed in Table 1. With the aim to demonstrate that blue light and far-red light are relatively inefficient for growth compared to red light, the inventors have quantified the expected growth efficiency for two scenarios. The results are shown in FIG. 3. The growth efficiency is expressed as the amount of fresh biomass produced per kWh of energy consumed by the supplemental lighting.

In one scenario (solid line), the blue light fraction, $f_B$, is varied while the far-red fraction, $f_{FR}$, is kept constant at 10%. In this case, a variation in the blue fraction implies an equal but opposite variation in the red fraction, $f_R$, to make sure the sum of the blue, red, and far-red fractions equals 100%. In a second scenario (dashed line), the far-red fraction is varied while the blue fraction is kept constant at 15%. A variation in the far-red fraction implies an equal but opposite variation in the red fraction, to make sure the sum of the blue, red, and far-red fractions equals 100%. Both scenarios demonstrate that the growth efficiency is negatively influenced (i.e. decreases) when increasing the fraction of blue light or the fraction of far-red light. The main reasons for this are that (i) according to the McCree curve red light is more efficient for photosynthesis compared to blue and far-red light (cf. FIG. 1) and (ii) according to Table 1 the efficacies of LEDs emitting blue or far-red light are less than those emitting red light.

The invention claimed is:

1. A system for illuminating a plant in a presence of an additional light source comprising sunlight that has a variable output, wherein the system comprises:
  a far-red light source, an output of the far-red light source configured to combine with the variable output of the additional light source to provide an amount of photosynthetically active radiation to illuminate the plant, said amount of photosynthetically active radiation configured to be measured by a light sensor; and
  a controller configured to vary the output of the far-red light source using a variable switch, such that, as the output of the additional light source varies, a percentage of total far-red light in the photosynthetically active radiation is no less than a far-red predetermined minimum percentage, wherein the far-red predetermined minimum percentage is below an average percentage of far-red light in daylight;
  wherein when the additional light source outputs a percentage of far-red light that is less than the far-red predetermined minimum percentage, the output of the far-red light source is varied such that the percentage of total far-red light in the photosynthetically active radiation is equal to the far-red predetermined minimum percentage; and
  wherein when the additional light source outputs a percentage of far-red light that is equal to or greater than the far-red predetermined minimum percentage, the far-red light source is switched off.

2. The system according to claim 1, wherein the far-red predetermined minimum percentage is 4%, 6%, 8%, or 10%.

3. The system according to claim 1, further comprising a blue light source, an output of the blue light source configured to combine with the outputs of the far-red light source and the additional light source to provide the amount of photosynthetically active radiation to illuminate the plant, and wherein the controller is configured to vary the output of the blue light source such that, as the output of the additional light source varies, a percentage of total blue light in the photosynthetically active radiation is no less than a blue predetermined minimum percentage.

4. The system according to claim 3, wherein the blue predetermined minimum percentage is 5%, 7%, 9%, 12%, or 15%.

5. The system according to claim 1, wherein the light sensor measures an amount of total blue light in the photosynthetically active radiation, an amount of total far-red light in the photosynthetically active radiation, and/or the amount of photosynthetically active radiation, wherein the light sensor is configured to measure:
  the amount of total blue light falling within a range of 400 nm to 500 nm,
  the amount of total far-red light falling within a range of 700 nm to 800 nm, and/or
  the amount of photosynthetically active radiation falling within a range of 400 to 700 nm.

6. The system according to claim 1, wherein the additional light source further comprises a red light source.

7. The system according to claim 3, wherein the blue light source, the far-red light source and a red light source each comprise an LED lamp, wherein
  the output of the blue light source has a spectrum with a peak wavelength ranging from 400 nm to 500 nm,
  the output of the far-red light source has a spectrum with a peak wavelength ranging from 700 nm to 800 nm, and
  the red light source has an output having a spectrum with a peak wavelength ranging from 600 nm to 700 nm.

8. A method of illuminating a plant in a presence of an additional light comprising sunlight that has a variable output, comprising:
  providing far-red light;
  combining the far-red light and the additional light to provide an amount of photosynthetically active radiation to illuminate the plant;
  determining by a light sensor an amount of photosynthetically active radiation offered to the plant and a percentage of total far-red light in the photosynthetically active radiation; and
  automatically varying the far-red light by controlling an output of the far-red light with a variable switch such that, as the additional light varies, the percentage of total far-red light in the photosynthetically active radiation is no less than a far-red predetermined minimum percentage, wherein the far-red predetermined minimum percentage is below an average percentage of far-red light in daylight;
  wherein when the far-red light provided by the additional light amounts to a percentage that is less than the far-red predetermined minimum percentage, the output of the far-red light is varied such that the percentage of total far-red light in the photosynthetically active radiation is equal to the far-red predetermined minimum percentage; and
  wherein when the far-red light provided by the additional light amounts to a percentage that is equal to or greater than the far-red predetermined minimum percentage, the far-red light is switched off.

9. The method of claim 8, further comprising:
  providing blue light;
  combining the blue light, the far-red light and the additional light to provide an amount of the photosynthetically active radiation to illuminate the plant; and
  automatically varying the blue light such that, as the additional light varies, a percentage of total blue light in the photosynthetically active radiation is no less than a blue predetermined minimum percentage.

10. A controller for use with a luminaire comprising a blue light source and a far-red light source, the controller comprising:
  a first signal port configured to receive a value corresponding to a percentage of total blue light in a photosynthetically active radiation and a value corresponding to a percentage of total far-red light in the photosynthetically active radiation wherein the blue light, the far-red light and an additional light combine to provide the photosynthetically active radiation, and wherein the additional light has a variable output;
  a second signal port configured to control an output of the blue light source and an output of the far-red light source with a variable switch; and
  a computer readable program, which when executed, varies:

(i) the output of the blue light source such that, as the additional light varies, the percentage of the total blue light in the photosynthetically active radiation is no less than a blue predetermined minimum percentage, wherein the blue predetermined minimum percentage is below an average percentage of blue light in daylight, and (ii) the output of the far-red light source such that, as the additional light varies, the percentage of total far-red light in the photosynthetically active radiation is no less than a far-red predetermined minimum percentage.

11. A computer program product including a set of non-transitory computer readable instructions stored on a memory and executable by a processor, the set of non-transitory computer readable instructions arranged to:

control illumination of a plant by providing far-red light in a presence of an additional light comprising sunlight having a variable light output;

control the combination of the far-red light and the additional light to provide an amount of photosynthetically active radiation to illuminate the plant; and automatically vary the far-red light such that, as the additional light varies, a percentage of total far-red light in the photosynthetically active radiation is no less than a far-red predetermined minimum percentage, wherein the far-red predetermined minimum percentage is below an average percentage of far-red light in daylight;

wherein when the far-red light provided by the additional light amounts to a percentage that is less than the far-red predetermined minimum percentage, the output of the far-red light is varied such that the percentage of total far-red light in the photosynthetically active radiation is equal to the far-red predetermined minimum percentage; and wherein when the far-red light provided by the additional light amounts to a percentage that is equal to or greater than the far-red predetermined minimum percentage, the far-red light is switched off.

* * * * *